(12) United States Patent
Hitosuga

(10) Patent No.: US 8,773,567 B2
(45) Date of Patent: Jul. 8, 2014

(54) IMAGE CAPTURING APPARATUS HAVING DISPLAY CONTROL OF INFORMATION AND FRAMES ON DISPLAYED IMAGES AND DISPLAY CONTROL METHOD

(75) Inventor: Emi Hitosuga, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 440 days.

(21) Appl. No.: 12/402,376

(22) Filed: Mar. 11, 2009

(65) Prior Publication Data

US 2009/0231470 A1 Sep. 17, 2009

(30) Foreign Application Priority Data

Mar. 11, 2008 (JP) ................................. 2008-061289

(51) Int. Cl.
*H04N 5/222* (2006.01)
*H04N 5/228* (2006.01)

(52) U.S. Cl.
USPC ............ 348/333.03; 348/333.02; 348/333.01; 348/222.1

(58) Field of Classification Search
CPC . H04N 5/23293; H04N 5/23212; G09G 5/14; G09G 2340/10; G09G 2340/12; G09G 2360/18; G09G 5/397; G06F 3/0481; G03B 13/02
USPC ...................................... 348/333.01–333.13
See application file for complete search history.

(56) References Cited

U.S. PATENT DOCUMENTS

| 5,463,728 | A  | * | 10/1995 | Blahut et al. ................... 715/807 |
| 5,469,536 | A  | * | 11/1995 | Blank ............................ 345/594 |
| 5,491,332 | A  |   | 2/1996  | Inbar et al. |
| 5,515,494 | A  | * | 5/1996  | Lentz ............................ 715/797 |
| 5,797,085 | A  | * | 8/1998  | Beuk et al. ....................... 455/88 |
| 5,805,163 | A  |   | 9/1998  | Bagnas |
| 5,943,050 | A  | * | 8/1999  | Bullock et al. ................. 715/783 |
| 5,953,019 | A  | * | 9/1999  | Shimakawa et al. .......... 345/535 |
| 6,081,618 | A  | * | 6/2000  | Naoi et al. ..................... 382/180 |
| 6,169,552 | B1 | * | 1/2001  | Endo et al. ..................... 345/427 |
| 6,344,860 | B1 | * | 2/2002  | Watts ............................ 715/765 |
| 6,587,118 | B1 | * | 7/2003  | Yoneda ......................... 345/629 |
| 6,670,970 | B1 | * | 12/2003 | Bonura et al. ................. 715/768 |
| 7,265,762 | B2 | * | 9/2007  | Purdy ............................ 345/629 |
| 7,359,003 | B1 | * | 4/2008  | Knighton et al. ............. 348/376 |
| 7,433,741 | B2 | * | 10/2008 | Bromley et al. ................ 700/17 |
| 7,893,950 | B2 |   | 2/2011  | Louveaux |
| 8,073,207 | B2 | * | 12/2011 | Ayaki et al. ................... 382/118 |
| 8,179,338 | B2 |   | 5/2012  | Engel et al. |
| 8,191,003 | B2 |   | 5/2012  | Brown et al. |
| 8,384,792 | B2 | * | 2/2013  | Ogawa ....................... 348/222.1 |
| 8,436,873 | B2 |   | 5/2013  | Gao |

(Continued)

FOREIGN PATENT DOCUMENTS

| JP | 09-027921 A   | 1/1997 |
| JP | 2003-134358 A | 5/2003 |

(Continued)

*Primary Examiner* — Chia-Wei A Chen
(74) *Attorney, Agent, or Firm* — Canon USA Inc IP Division

(57) ABSTRACT

When various kinds of information and various frames are superimposed on a displayed image of a subject during live view shooting, an object to be preferentially displayed is switched between the various kinds of information and the various frames in accordance with an overlapping state of the various kinds of information and the various frames if the various kinds of information overlap the various frames.

4 Claims, 10 Drawing Sheets

(56) References Cited

U.S. PATENT DOCUMENTS

| | | | |
|---|---|---|---|
| 2001/0022585 A1* | 9/2001 | Endo et al. | 345/427 |
| 2004/0233224 A1* | 11/2004 | Ohba | 345/629 |
| 2004/0252137 A1* | 12/2004 | Gelber | 345/629 |
| 2005/0134607 A1* | 6/2005 | Purdy | 345/629 |
| 2005/0175251 A1 | 8/2005 | Taketa et al. | |
| 2005/0219395 A1* | 10/2005 | Sugimoto | 348/333.12 |
| 2006/0026535 A1* | 2/2006 | Hotelling et al. | 715/863 |
| 2006/0078173 A1* | 4/2006 | Isomura et al. | 382/118 |
| 2007/0070186 A1* | 3/2007 | Fujimori et al. | 348/14.03 |
| 2007/0071329 A1* | 3/2007 | Terakawa | 382/225 |
| 2007/0078526 A1* | 4/2007 | Bromley et al. | 700/19 |
| 2007/0115371 A1* | 5/2007 | Enomoto et al. | 348/222.1 |
| 2007/0121012 A1 | 5/2007 | Hida et al. | |
| 2007/0168122 A1* | 7/2007 | Aspen | 701/211 |
| 2007/0188646 A1* | 8/2007 | Kobayashi et al. | 348/333.11 |
| 2007/0229695 A1* | 10/2007 | Kato | 348/333.12 |
| 2007/0263997 A1* | 11/2007 | Hirai et al. | 396/123 |
| 2007/0266312 A1* | 11/2007 | Ayaki et al. | 715/526 |
| 2008/0024643 A1* | 1/2008 | Kato | 348/333.01 |
| 2008/0068487 A1* | 3/2008 | Morita | 348/333.05 |
| 2008/0106629 A1* | 5/2008 | Kurtz et al. | 348/333.01 |
| 2008/0111889 A1* | 5/2008 | Fujita et al. | 348/208.5 |
| 2008/0118156 A1* | 5/2008 | Okada | 382/195 |
| 2008/0122939 A1* | 5/2008 | Hirai | 348/222.1 |
| 2008/0123953 A1* | 5/2008 | Anderson et al. | 382/168 |
| 2008/0136958 A1* | 6/2008 | Nakahara | 348/345 |
| 2008/0144890 A1* | 6/2008 | Ogawa | 382/118 |
| 2008/0240563 A1* | 10/2008 | Takano et al. | 382/173 |
| 2009/0021576 A1* | 1/2009 | Linder et al. | 348/36 |
| 2009/0027555 A1* | 1/2009 | Hanko et al. | 348/569 |
| 2009/0089661 A1* | 4/2009 | Imamoto | 715/243 |
| 2009/0096810 A1* | 4/2009 | Green | 345/620 |
| 2009/0138811 A1* | 5/2009 | Horiuchi et al. | 715/768 |
| 2009/0161964 A1* | 6/2009 | Tzur et al. | 382/203 |
| 2009/0167633 A1 | 7/2009 | Cohen et al. | |
| 2009/0273667 A1* | 11/2009 | Nozaki et al. | 348/77 |
| 2009/0288036 A1 | 11/2009 | Osawa et al. | |
| 2010/0013981 A1* | 1/2010 | Yasuda | 348/345 |
| 2010/0142842 A1* | 6/2010 | Damkjer et al. | 382/260 |

FOREIGN PATENT DOCUMENTS

| | | |
|---|---|---|
| JP | 2006-254129 A | 9/2006 |
| JP | 2007-199311 A | 8/2007 |
| JP | 2007-274587 A | 10/2007 |
| WO | WO 2007052382 A1 * | 5/2007 |

* cited by examiner

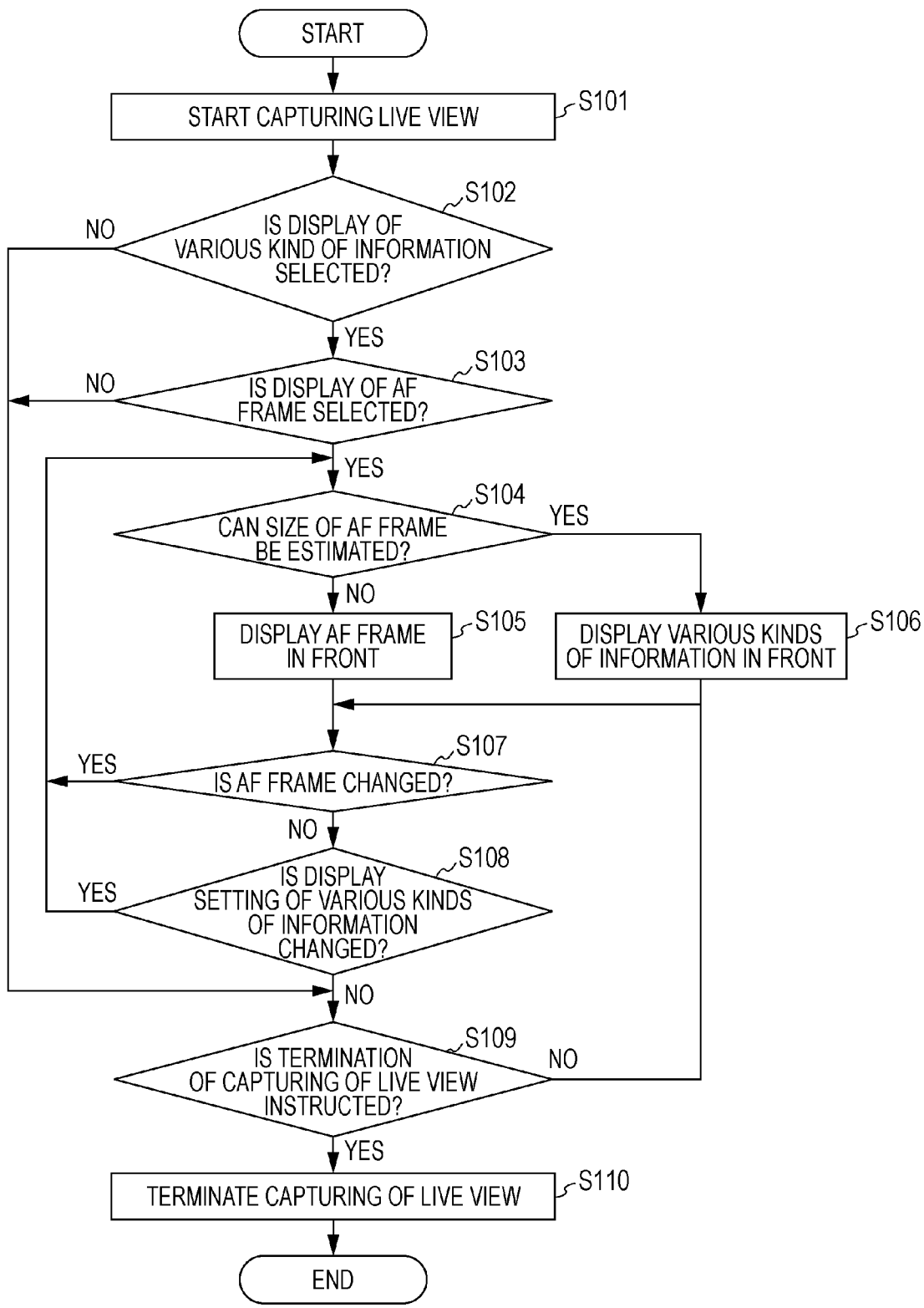

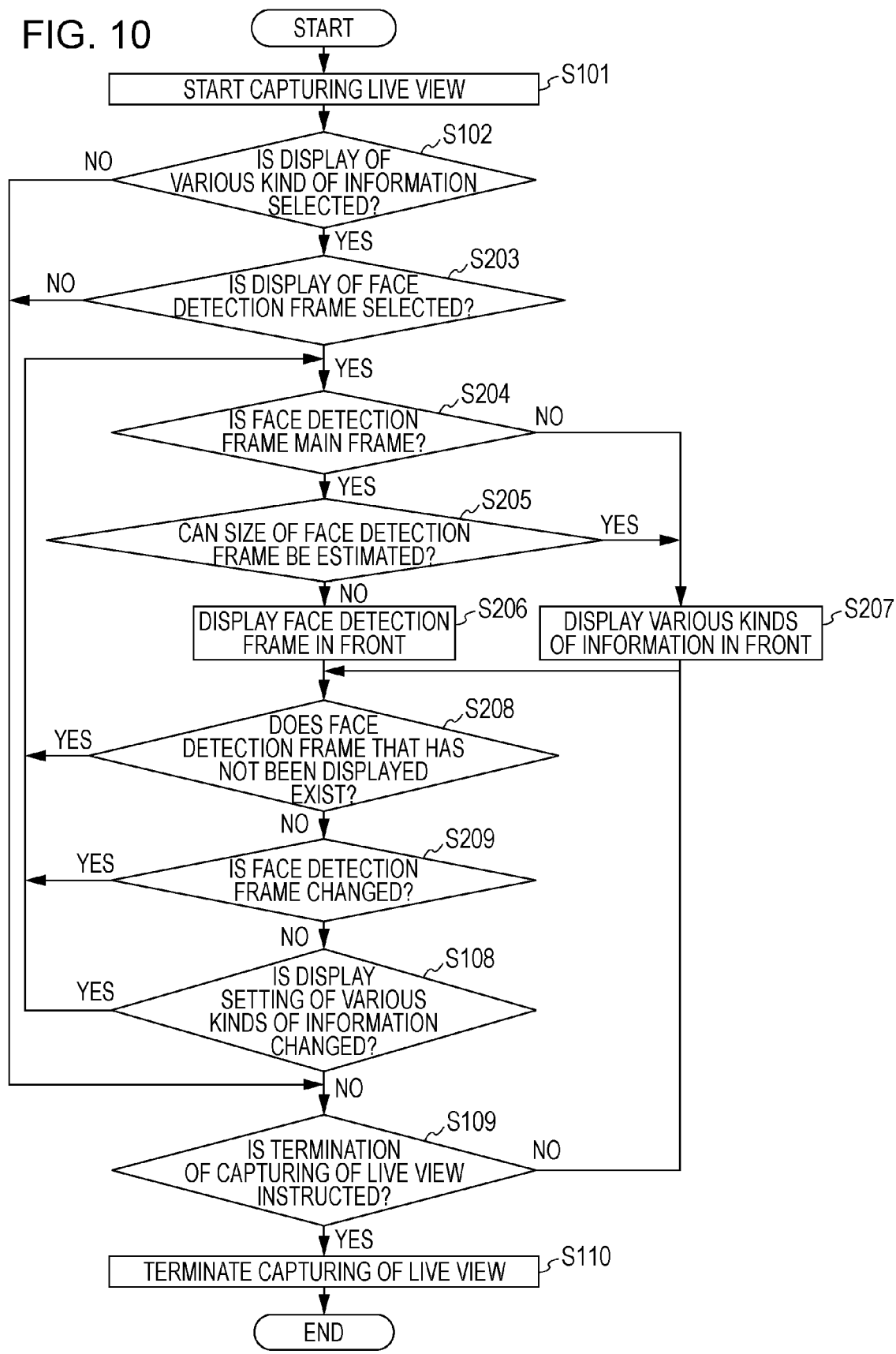

IMAGE CAPTURING APPARATUS HAVING DISPLAY CONTROL OF INFORMATION AND FRAMES ON DISPLAYED IMAGES AND DISPLAY CONTROL METHOD

BACKGROUND OF THE INVENTION

1. Field of the Invention

The present invention relates generally to image capturing apparatuses. More particularly, the present invention relates to an image capturing apparatus having a live view shooting function.

2. Description of the Related Art

There are digital cameras according to the related art having a live view shooting function that allows users to capture images while displaying images of a subject formed on an image pickup element through a lens on a display screen, such as a liquid crystal display, realtime. During live view shooting, various kinds of information on image capturing settings, such as the white balance, the recording image quality, and the color space, are superimposed on displayed live view images, thereby allowing users to easily recognize various settings while watching the displayed images. In addition, an auto focus (AF) frame that specifies an area of the displayed image subjected to auto focus processing, an enlargement frame that specifies an area to be enlarged, and a face detection frame that informs users of a detected face of a subject can be superimposed on the displayed images.

The size and position of the AF frame or the enlargement frame can be freely changed in response to user operations. Additionally, the size and position of the face detection frame change in accordance with a subject. Accordingly, the following problem may be caused. For example, when a displayed AF frame overlaps displayed various kinds of setting information, such as the white balance, the recording image quality, and the color space, one object is hidden by another object, which thus makes it difficult for users to recognize the displayed content.

To cope with such a problem, Japanese Patent Laid-Open No. 2003-134358 discloses a technique for stopping displaying setting information if a displayed AF cursor, which indicates an in-focus position, overlaps the setting information.

However, since the setting information is hidden if the displayed AF cursor overlaps the setting information in the technique disclosed in Japanese Patent Laid-Open No. 2003-134358, users may be unable to recognize the content of the setting information while the AF cursor is overlapping the setting information.

SUMMARY OF THE INVENTION

The present invention provides an image capturing apparatus that allows users to optimally recognize displayed information and displayed frames that are superimposed on displayed images.

An image capturing apparatus according to an aspect of the present invention includes: an image capturing unit configured to capture an image of a subject to acquire image data; a display unit configured to display the image of the subject based on the image data acquired by the image capturing unit; and a display control unit configured to perform a control operation so that information displayed at a predetermined position and a movably displayed frame are superimposed on the image of the subject displayed by the display unit. The display control unit displays either the information or the frame preferentially in accordance with an overlapping state of the information and the frame when the information overlaps the frame.

Further features of the present invention will become apparent from the following description of exemplary embodiments with reference to the attached drawings.

BRIEF DESCRIPTION OF THE DRAWINGS

FIG. 8 is a flowchart showing processing for controlling display of an AF frame according to a first exemplary embodiment of the present invention.

FIG. 10 is a flowchart showing processing for controlling display of a face detection frame according to a second exemplary embodiment of the present invention.

DESCRIPTION OF THE EMBODIMENTS

Figure 1:
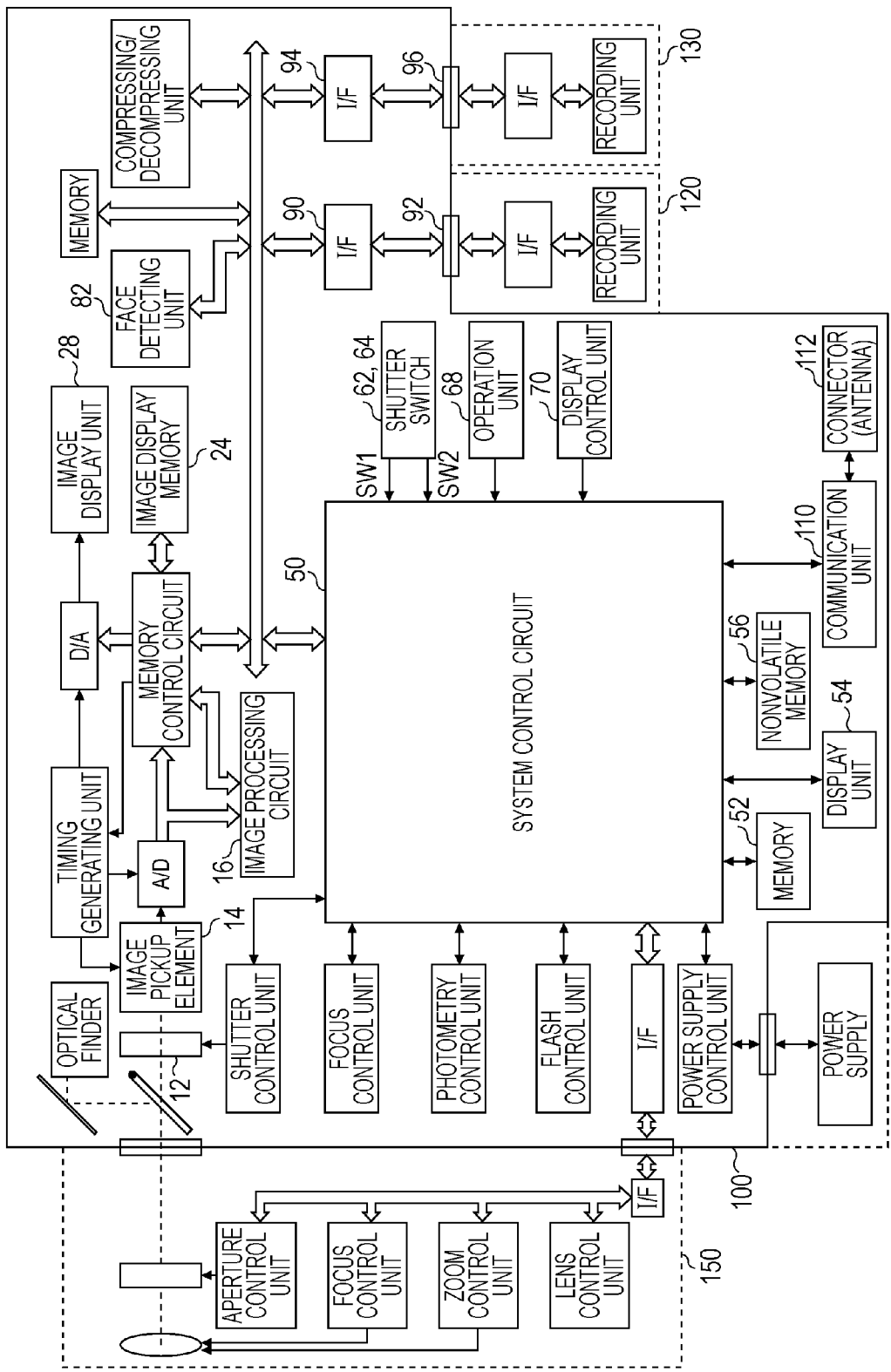
FIG. 1 is a block diagram showing a configuration of a digital camera according to an exemplary embodiment of the present invention.

A first exemplary embodiment of the present invention will be described. FIG. 1 is a block diagram showing a configuration of a digital camera according to the first exemplary embodiment of the present invention. The digital camera includes a camera main body 100 and a lens unit 150 that is exchangeably attached to the camera main body 100. The camera main body 100 includes an image pickup element 14 for converting an optical image into electrical signals, and a shutter 12 for controlling an exposure amount of the image pickup element 14. An image processing circuit 16 converts analog signals output from the image pickup element 14 into digital signals (image data) with an analog-to-digital (A/D) converter. The image processing circuit 16 also performs various kinds of processing, such as pixel interpolation processing and color conversion processing, on image data supplied from a memory control circuit. Additionally, the image processing circuit 16 performs predetermined calculation processing using image data. On the basis of the acquired calculation result, a system control circuit 50 controls a shutter control unit, a focus control unit, and an aperture control unit to perform auto focus (AF) processing, auto exposure (AE) processing, pre-flash (EF) processing. Furthermore, the image processing circuit 16 performs auto white balance (AWB) processing based on the acquired calculation result. The camera main body 100 also includes an image display memory 24 and an image display unit 28, which may be a liquid crystal display. Image data written in the image display memory 24 is displayed on the image display unit 28 after being processed by a digital-to-analog (D/A) converter.

The system control circuit 50 controls the camera main body 100. A memory 52 stores parameters, variables, and programs for operations of the system control circuit 50. A display unit 54 displays, using characters, images, and audio, an operation state and messages in accordance with execution of the programs by the system control circuit 50. One or more display units 54 are provided at a position, which is near an operation unit 68 of the camera main body 100 and is easily recognized by users. The display unit 54 may be constituted by a combination of, for example, a liquid crystal display (LCD), light-emitting diodes (LED), and sound-emitting element. A nonvolatile memory 56 may be an electrically erasable programmable read-only memory (EEPROM). Data is electrically erased from or recorded on the nonvolatile memory 56.

When a shutter button, not shown, is pressed half-way, a shutter switch SW1 62 is turned ON to instruct starting of AF processing, AE processing, AWB processing, and EF processing. When a shutter button, not shown, is pressed fully, a shutter switch SW2 64 is turned ON to instruct the system control circuit 50 to start a series of image capturing operations. The series of image capturing operations indicate exposure processing, development processing, and recording processing. The operation unit 68 may include various buttons and a touch panel.

A display control unit 70 displays various kinds of information superimposed on an image displayed on the image display unit 28. The information to be displayed includes setting information indicating settings regarding the white balance and the recording image quality, a histogram indicating luminance distribution of a captured live view image, status information indicating a remaining battery level and the number of capturable images, and warning information indicating that the current state is not suitable for use. These various kinds of information are displayed at predetermined fixed positions on the image display unit 28.

The display control unit 70 also displays an AF frame specifying an area of a display image subjected to AF processing, an enlargement frame specifying an area to be enlarged, and a face detection frame informing users of a detected face of a subject. The display positions of these frames are not fixed and can be moved to given positions through user operations.

Furthermore, when the position of the displayed information overlaps the position of the displayed frame, the display control unit 70 performs a control operation so that either the information or the frame is displayed preferentially in accordance with the overlapping state.

A face detecting unit 82 performs a predetermined face detecting operation on image data supplied from the image processing circuit 16 or image data supplied from the memory control circuit. Interfaces 90 and 94 serve as interfaces with recording media, such as a memory and a hard disk. Connectors 92 and 96 connect the camera main body 100 to recording media, such as a memory card and a hard disk. A communication unit 110 has various communication functions, such as communication through RS-232C (recommended standard 232 version C), USB, IEEE 1394, P1284, SCSI, modem, LAN, and wireless communication. A connector 112 connects the camera main body 100 with other apparatuses through the communication unit 110. The connector 112 may be an antenna when wireless communication is carried out. Recording media/units 120 and 130 may be a memory card and a hard disk.

Figure 2:
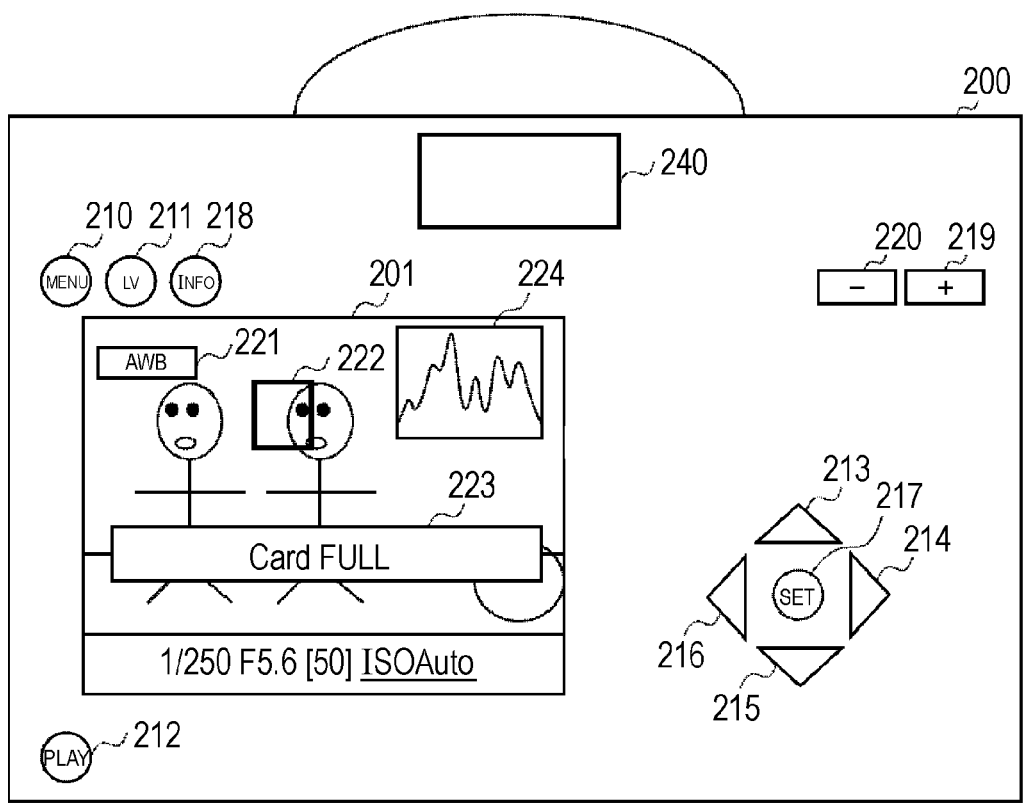
FIG. 2 is a back view of a digital camera according to an exemplary embodiment of the present invention.

FIG. 2 is a back view of the digital camera according to the exemplary embodiment. FIG. 2 shows a state where an image formed on the image pickup element 14 is displayed on the image display unit 28. A shooting operation performed with the image formed on the image pickup element 14 being displayed on the image display unit 28 is referred to as live view shooting.

A back face 200 of the camera main body 100 includes a liquid crystal display 201, which corresponds to the image display unit 28 shown in FIG. 1. Various buttons 210-220 correspond to the operation unit 68 shown in FIG. 1. An optical finder 240 is also included.

An image formed on the image pickup element 14 through a lens is displayed on the liquid crystal display 201 realtime. Various kinds of information and various frames can be superimposed on the displayed image. Referring to FIG. 2, setting information 221 regarding image capturing functions, warning information 223, and a histogram 224 are displayed as the various kinds of information. An AF frame 222 indicating an area subjected to the auto focus processing is also displayed. The various kinds of information will be described in detail later with reference to FIG. 3, whereas the AF frame 222 will be described in detail later with reference to FIG. 6. The display control unit 70 controls display of the various kinds of information and the AF frame 222.

Various kinds of information displayed on the liquid crystal display 201 during live view shooting will now be described using FIG. 3.

Pieces of information 301-304 regarding image capturing functions are displayed in accordance with a content of a setting made by a user. The information 301 is white balance setting information. The information 302 is recording image quality setting information. The information 303 is setting information regarding a photometry method. The information 304 is color space setting information. The above-described setting information is only an example and other kinds of information regarding image capturing functions may be displayed.

Warning information 310 indicates that there is no available space in a recording medium inserted into an image capturing apparatus. A histogram 320 shows luminance distribution of a live view image.

The various kinds of information are superimposed on images displayed on the image display unit 28 during live view shooting. At this time, semitransparent processing may be performed so that the image displayed under the various kinds of information can be seen therethrough. When the various kinds of information are displayed preferentially of a frame, such as an AF frame, the semitransparent processing is performed on the various kinds of information so that the image displayed under the various kinds of information can be seen therethrough but the frame is not seen therethrough.

Figure 3:
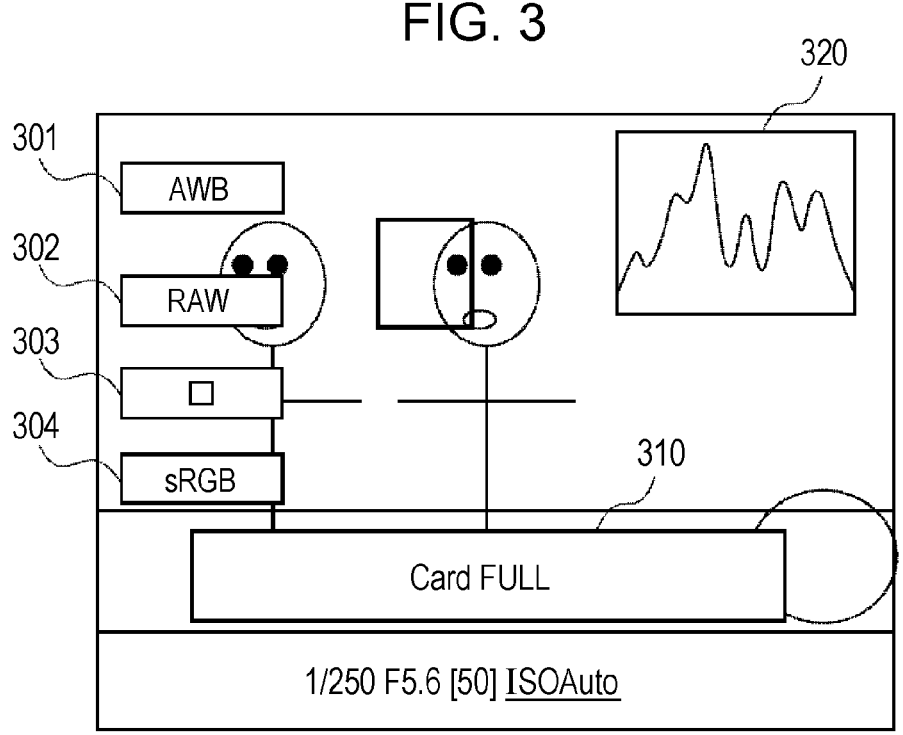
FIG. 3 is a diagram showing various kinds of information displayed during live view shooting.
Figure 4A:
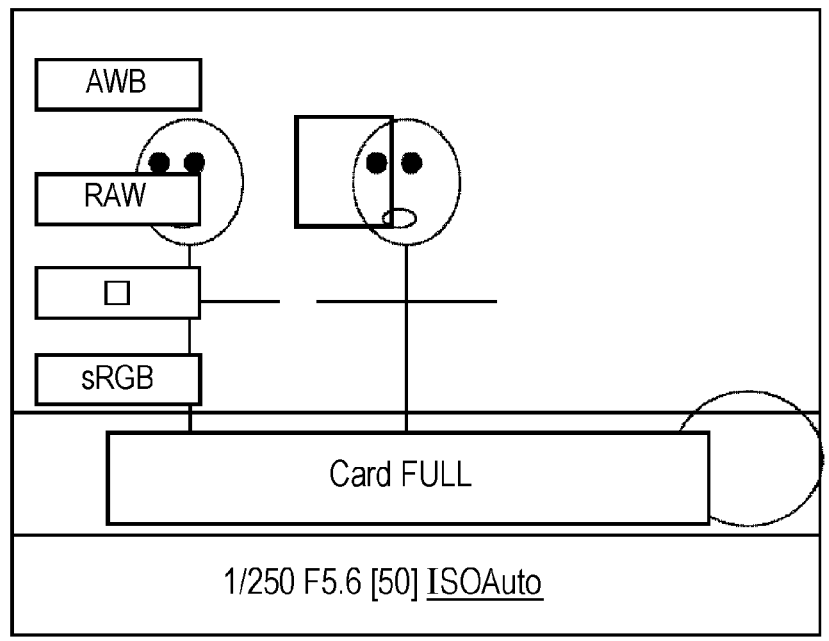
FIGS. 4A and 4B are diagrams showing switching of kinds of information displayed during live view shooting.
Figure 4B:
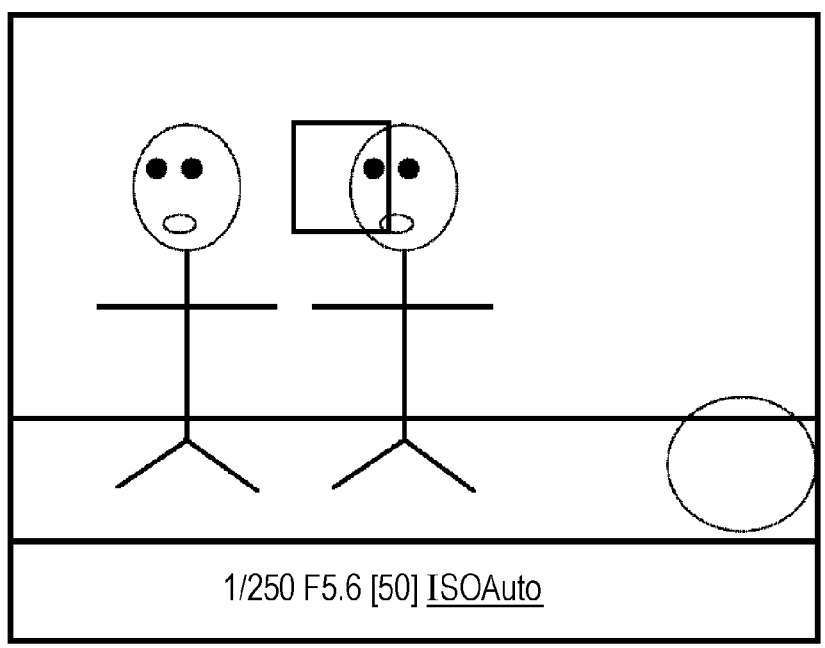

FIGS. 4A and 4B are diagrams showing switching of kinds of information displayed on the liquid crystal display 201. Although various kinds of information are displayed on the liquid crystal display 201 shown in FIG. 3, kinds of the displayed information can be switched by operating the INFO button 218, shown in FIG. 2, for instructing switching of display. FIG. 4A shows a state where only the histogram 320 is hidden from the state shown in FIG. 3, whereas FIG. 4B shows a state where the setting information 301-304 regarding image capturing functions, the warning information 310, and the histogram 320 are hidden from the state shown in FIG. 3.

Figure 5:
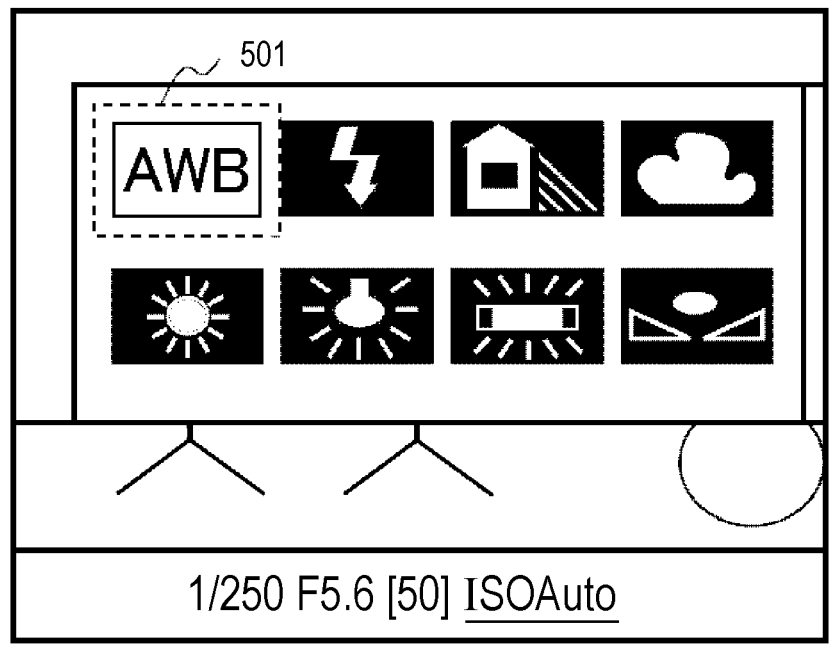
FIG. 5 is a diagram showing a screen on which a white balance setting is changed.

FIG. 5 is a diagram showing a screen on which settings regarding image capturing functions are changed. As one example, FIG. 5 shows a screen on which a white balance setting is changed.

In response to pressing of the menu button 210, shown in FIG. 2, for displaying menu items, the liquid crystal display 201 switches the screen shown in FIG. 3 into the screen shown in FIG. 5. A selection frame 501 is for selecting a white balance setting.

If a user presses the SET button 217, shown in FIG. 2, after operating the arrow keys 213-216 shown in FIG. 2 to move the selection frame 501, the setting selected with the selection frame 501 is reflected in the digital camera and the displayed screen is switched into the screen shown in FIG. 3. At this time, the white balance setting information displayed on the image display unit 28 is also changed into the selected setting.

Figure 6:
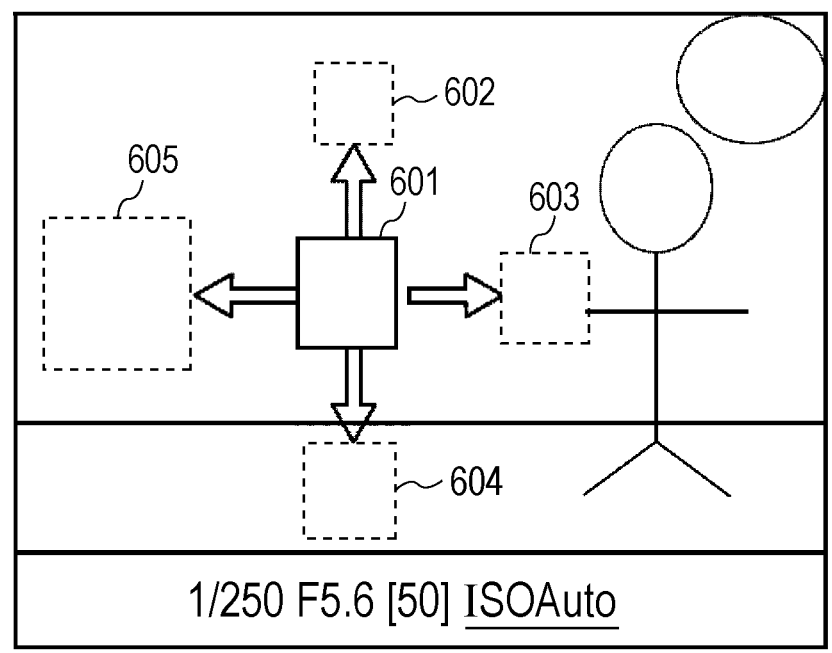
FIG. 6 is a diagram illustrating an AF frame displayed during live view shooting.

FIG. 6 is a diagram illustrating an AF frame displayed during live view shooting.

An AF frame 601 is similar to the AF frame 222. The AF frame 601 may be drawn by a solid line or a broken line in any given color. By operating the arrow keys 213-216 shown in FIG. 2, a user can freely move the AF frame 601 within the screen. The size of the AF frame 601 can also be changed freely. In response to pressing of the enlarge button 219 shown in FIG. 2, the size of the AF frame 601 is enlarged as shown by a frame 604 or 605. In response to pressing of the reduce button 220 shown in FIG. 2, the size of the AF frame 601 is reduced as shown by a frame 602 or 603. An inner area of the AF frame 601 is transparent so that a user can check the displayed image.

The AF processing according to a TVAF method is performed during live view shooting. In the TVAF method, an AF evaluation value indicating sharpness of an image is calculated on the basis of a video signal of an image resulting from photoelectric conversion of an image pickup element. A focus lens is then driven so that the maximum AF evaluation value is obtained. In this manner, the focus is adjusted. The AF evaluation value is calculated on the basis of high-frequency components of the video signal extracted by a bandpass filter. Generally, the position of the focus lens that gives the maximum AF evaluation value corresponds to a focal point. When the AF frame is displayed on the image display unit 28, AF processing is performed on the area enclosed by the AF frame.

A setting for displaying a movable AF frame on the image display unit 28 can be selected from an AF frame setting of the menu items. Additionally, for example, a setting for fixing the AF-processing target area at a predetermined area at the center of the image display unit 28 and a setting for automatically selecting the AF-processing target area from a plurality of predetermined areas of the image display unit 28 in accordance with an image capturing state can be selected in the AF frame setting.

FIGS. 7A-7H are diagrams showing criteria employed when the display control unit 70 determines an object, i.e., an AF frame or various kinds of information, to be preferentially displayed in accordance with an overlapping state of the various kinds of information and the AF frame and controls display of the information and the frame. Hereinafter, displaying an object in front corresponds to preferentially displaying the object.

In the case where the displayed various kinds of information overlap the AF frame, the display control unit 70 displays the various kinds of information in front when the size of the AF frame can be estimated even if the various kinds of information are displayed in front of the AF frame. If estimation of the size of the AF frame is difficult, the display control unit 70 displays the AF frame in front.

Figure 7A:
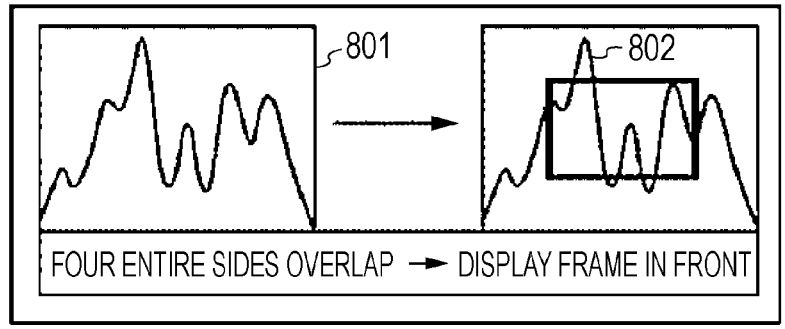
FIGS. 7A-7H are diagrams showing criteria employed when whether an AF frame or various kinds of information is displayed in front is determined.
Figure 7B:
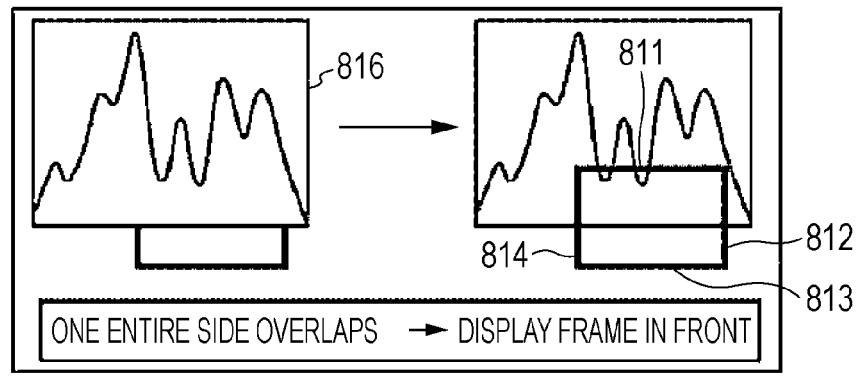
Figure 7C:
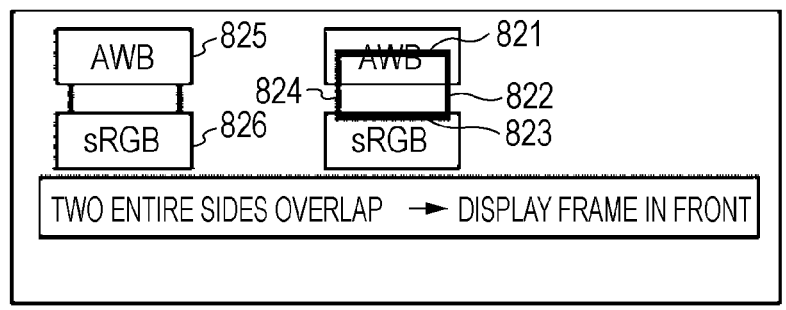

FIGS. 7A, 7B, and 7C show cases where it is determined that the AF frame is displayed in front of the various kinds of information.

Figure 7D:
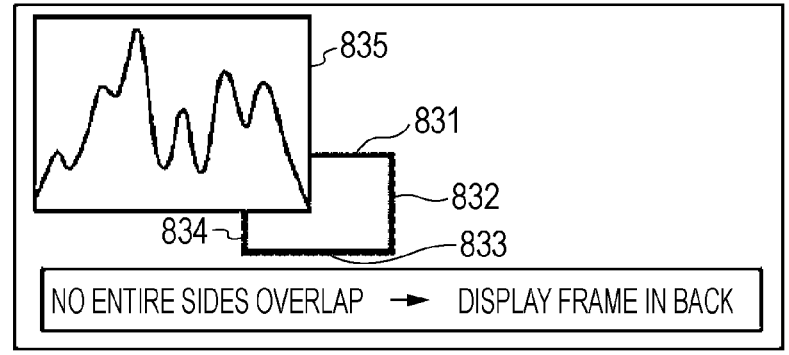
Figure 7E:
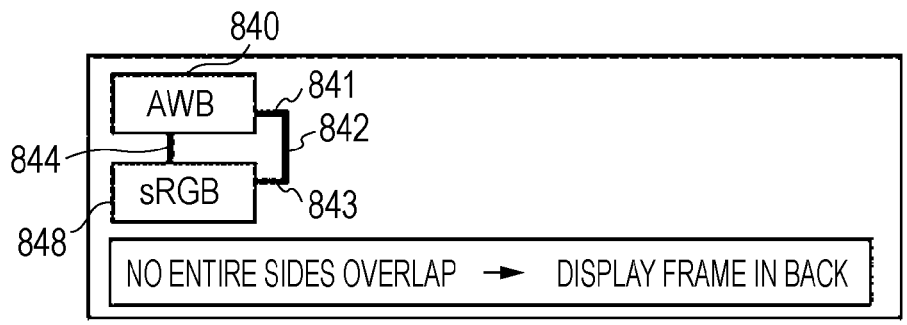
Figure 7F:
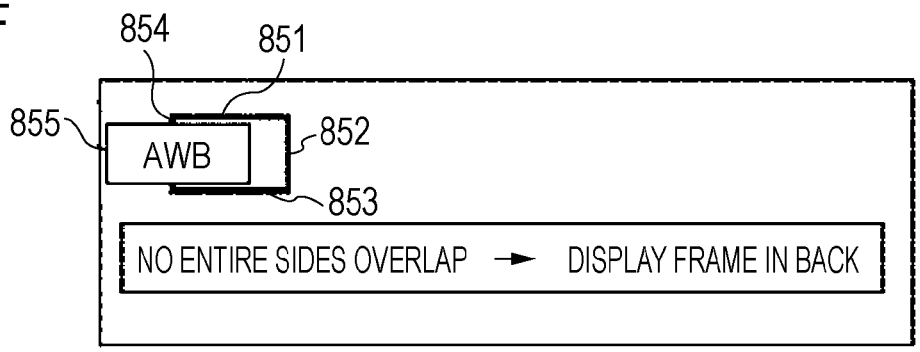

FIGS. 7D, 7E, and 7F show cases where it is determined that the various kinds of information are displayed in front of the AF frame.

Figure 7G:
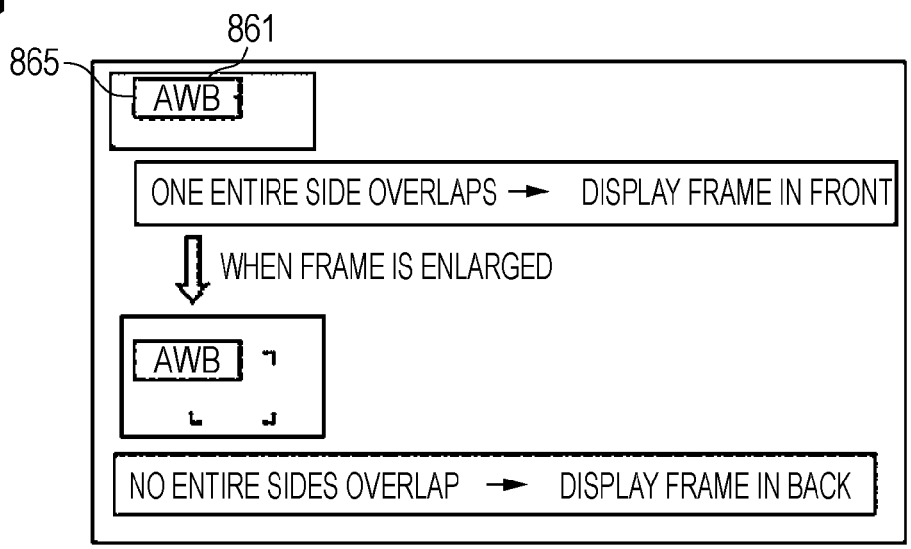

FIG. 7G shows a case where an object displayed in front is changed from the AF frame to the various kinds of information in response to a change in the size of the AF frame.

Referring to FIG. 7A, an entire AF frame 802 overlaps a histogram 801. In this case, when the histogram 801 is displayed in front of the AF frame 802, recognition of the AF frame 802 becomes difficult. Accordingly, the display control unit 70 performs a control operation to display the AF frame 802 in front of the histogram 801.

Referring to FIG. 7B, since an entire side 811 of the AF frame overlaps a histogram 816 though parts of sides 812 and 814 of the AF frame and an entire side 813 can be seen, estimation of the size of the AF frame is difficult if the histogram 816 is displayed in front. Accordingly, the display control unit 70 performs a control operation to display the AF frame in front of the histogram 816.

Referring to FIG. 7C, an entire side 821 of the AF frame overlaps white balance setting information 825 and an entire side 823 of the AF frame also overlaps color space setting information 826. On the other hand, both of sides 822 and 824 of the AF frame partially overlap the displayed white balance setting information 825 and the displayed color space setting information 826. In this case, if the white balance setting information 825 and the color space setting information 826 are displayed in front, estimation of the size of the AF frame is difficult. Accordingly, the display control unit 70 performs a control operation to display the AF frame in front of the setting information.

Referring to FIG. 7D, parts of sides 831 and 834 of the AF frame overlap a histogram 835 but entire sides 832 and 833 of the AF frame can be seen. In this case, since the size of the AF frame can be estimated even if the histogram 835 is displayed in front, the display control unit 70 performs a control operation to display the histogram 835 in front of the AF frame.

Referring to FIG. 7E, a part of a side 841 of the AF frame overlaps white balance setting information 840. In addition, a part of a side 843 of the AF frame overlaps color space setting information 848. A part of a side 844 of the AF frame overlaps the white balance setting information 840 and the color space setting information 848. As described above, although there are areas where sides of the AF frame overlap the setting information, parts of the sides 841, 843, and 844 of the AF frame and an entire side 842 can be seen. In this case, since the size of the AF frame can be estimated even if the white balance setting information 840 and the color space setting information 848 are displayed in front, the display control unit 70 performs a control operation to display the setting information in front of the AF frame.

Referring to FIG. 7F, a part of a side 854 of the AF frame overlaps white balance setting information 855 but entire sides 851, 852, and 853 of the AF frame can be seen. In this case, since the size of the AF frame can be estimated even if the white balance setting information 855 is displayed in front, the display control unit 70 performs a control operation to display the setting information 855 in front of the AF frame.

Referring to FIG. 7G, when the AF frame is small, an entire upper side of an AF frame 861 overlaps white balance setting information 865. Thus, estimation of the size of the AF frame is difficult if the white balance setting information 865 is displayed in front. Accordingly, the display control unit 70 performs a control operation to display the AF frame in front of the setting information.

When the AF frame is enlarged by a user operation, only a part of the upper side of the AF frame overlaps the white balance setting information 865. Since the size of the AF frame can be estimated due to enlargement of the AF frame even if the white balance setting information 865 is displayed in front, the display control unit 70 performs a control operation to display the setting information in front of the AF frame.

When estimation of the size of the AF frame becomes difficult in response to reduction of the AF frame, the display control unit 70 performs a control operation so that the object displayed in front is changed from the setting information to the AF frame.

As described above, when at least one entire side of the AF frame overlaps the displayed various kinds of information, estimation of the size of the AF frame is difficult if the various kinds of information are displayed in front of the AF frame. Thus, the AF frame is displayed in front of the various kinds of information.

In addition, as shown in FIG. 7G, when the size of the AF frame is shown by displaying only both ends of each side of the AF frame, estimation of the size of the AF frame may be difficult if only a part of the side of the AF frame overlaps the various kinds of information. For example, this case corresponds to a case where both ends of a side of the AF frame overlap the various kinds of information. In such a case, the display control unit 70 performs a control operation to display the AF frame in front of the various kinds of information.

Figure 7H:
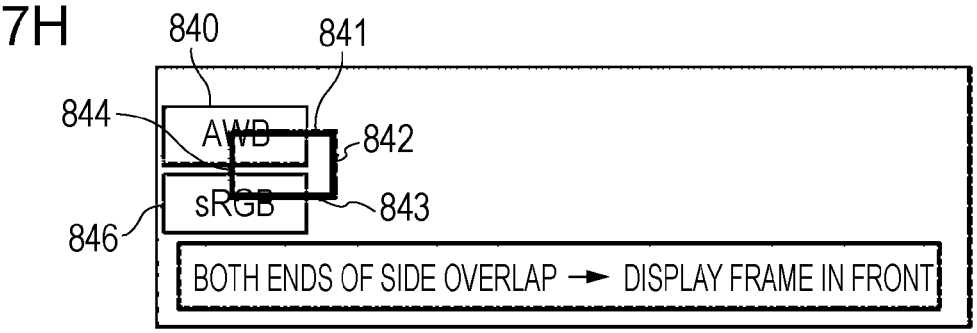

Additionally, when a gap between the white balance setting information 840 and the color space setting information 848 is smaller in FIG. 7E, estimation of the size of the AF frame may be difficult even if the part of the side 844 is displayed. Accordingly, when both ends of at least one side of the AF frame overlap the various kinds of information, the display control unit 70 may perform a control operation to display the AF frame in front of the various kinds of information as shown in FIG. 7H.

Processing for controlling an object, i.e., an AF frame or various kinds of information, displayed in front will now be described using a flowchart shown in FIG. 8. The display control unit 70 performs processing at steps S102 to S108.

First, in response to pressing of the live view button 211, shown in FIG. 2, for instructing starting or termination of live view shooting, the system control circuit 50 starts live view shooting (S101).

The display control unit 70 determines whether a setting for displaying various kinds of information, such as setting information regarding image capturing functions and a histogram, on the image display unit 28 is selected (S102). The kinds of the information to be displayed on the image display unit 28 can be changed by operating the INFO button 218. No information may be displayed on the image display unit 28.

If the setting for displaying the various kinds of information on the image display unit 28 is selected (YES at S102), the display control unit 70 determines whether to display an AF frame on the image display unit 28 (S103). When the setting for displaying the AF frame on the image display unit 28 is selected (YES at S103), the AF frame may be displayed after a user selects the setting for displaying the AF frame and specifies a position of the AF frame. Alternatively, the AF frame may be displayed at a predetermined initial position in response to the user's selection of the setting for displaying the AF frame.

When the setting for displaying the AF frame on the image display unit 28 is selected (YES at S103), the display control unit 70 determines whether the size of the AF frame can be estimated based on the position and size of the AF frame and the position of the various kinds of information even if the various kinds of information are displayed in front of the AF frame (S104). This determination regarding whether the size of the AF frame can be estimated even if the various kinds of information are displayed in front of the AF frame is performed based on the criteria shown in FIGS. 7A-7H.

When it is determined that estimation of the size of the AF frame is difficult if the various kinds of information are displayed in front of the AF frame (NO at S104), the display control unit 70 displays the AF frame in front of the various kinds of information (S105).

When the size of the AF frame can be estimated even if the various kinds of information are displayed in front of the AF frame (YES at S104), the display control unit 70 displays the various kinds of information in front of the AF frame (S106).

The display control unit 70 then determines whether the position or the size of the AF frame has been changed (S107). If the position or the size of the AF frame has been changed (YES at S107), the process returns to STEP S104. If the position or the size of the AF frame has not been changed (NO at S107), the process proceeds to STEP S108. If the displayed AF frame is hidden, the process also proceeds to STEP S108. Additionally, if the AF frame, which has been hidden, is newly displayed, the process returns to STEP S104.

The display control unit 70 then determines whether the setting for displaying the various kinds of information on the image display unit 28 has been changed (S108). The kinds of information to be displayed on the image display unit 28 can be changed by operating the INFO button 218. An AF frame, which has not been overlapping the various kinds of information, may overlap the newly displayed information. Conversely, information, which has been overlapping the AF frame, may be hidden. The processing at STEP S108 is performed for such cases.

The system control circuit 50 then determines whether termination of live view shooting is instructed with the live view button 211 (S109). If the termination is instructed (YES at S109), the system control circuit 50 terminates the live view shooting operation (S110). If the termination is not instructed (NO at S109), the process returns to STEP S107.

As described above, an object displayed in front, i.e., an AF frame or various kinds of information, is controlled in accordance with an overlapping state of the AF frame and the various kinds of information, thereby allowing a user to optimally recognize both of the AF frame and the various kinds of information, which thus results in an improvement of a user interface.

The display control operation may be performed in the similar manner on an enlargement frame specifying an area of a displayed image to be enlarged as well as the AF frame.

A second exemplary embodiment of the present invention will now be described. A digital camera according to the second exemplary embodiment of the present invention has a configuration shown in the block diagram of FIG. 1. Since the configuration is similar to that employed in the first exemplary embodiment, a description thereof is omitted.

Although a method for controlling display of an AF frame and various kinds of information has been described in the first exemplary embodiment, a method for controlling display of a face detection frame and various kinds of information will be described in the second exemplary embodiment.

Figure 9:
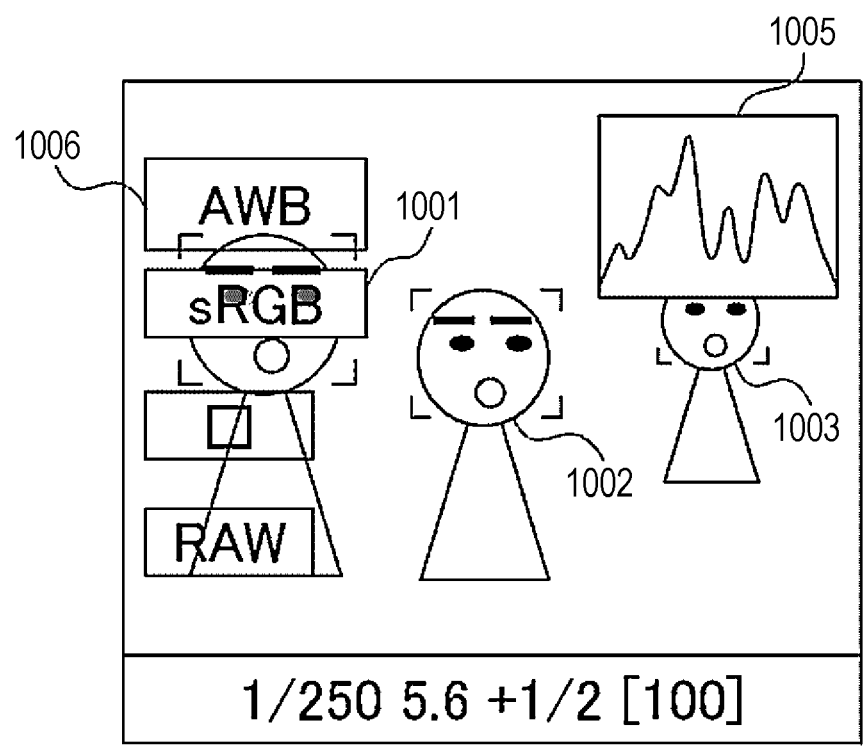
FIG. 9 is a diagram showing a state where a face detection frame is displayed according to a second exemplary embodiment of the present invention.

FIG. 9 is a diagram showing an image displayed on the liquid crystal display 201 during live view shooting. Each of face detection frames 1001, 1002, and 1003 is displayed at an area that is recognized to include a face of a subject by the face detecting unit 82. When a plurality of faces of subjects are detected, a plurality of face detection frames are displayed to enclose areas recognized to include the faces. The face detection frames are categorized into a main frame and a sub frame based on the size of an area recognized to include a face and the position of the area in an image. The system control circuit 50 determines whether a face detection frame is a main frame or a sub frame on the basis of a detection result of the face detecting unit 82. The image display unit 28 displays a main frame for a face determined as a main subject and displays a sub frame for a face determined as a subject other than the main subject. A user may select a face detection frame serving as the main frame by operating the operation unit 68. Referring to FIG. 9, the frame 1001 is a main frame, whereas the frames 1002 and 1003 are sub frames. Different control operations are performed between a case where a main frame overlaps various kinds of information and a case where a sub frame overlaps various kinds of information. Since the sub frame is displayed for a face of a subject other than the main subject, the user may set the lower priority for the sub frame. Accordingly, when the sub frame overlaps the various kinds of information, the various kinds of information are preferentially displayed. That is, the various kinds of information are displayed in front regardless of whether the size of the sub frame can be estimated or not.

Referring to FIG. 9, an entire upper side of the face detection frame 1001 overlaps white balance setting information 1006. Since the face detection frame 1001 is a main frame, the display control unit 70 performs a control operation to display the face detection frame 1001 in front of the setting information 1006. The object to be displayed in front, i.e., the main frame or the various kinds of information, is determined on the basis of the criteria shown in FIGS. 7A-7H.

Although an entire upper side of the face detection frame 1003 overlaps a histogram 1005, the display control unit 70 performs a control operation to display the histogram 1005 in front of the face detection frame 1003 since the face detection frame 1003 is a sub frame.

If the face detection frames 1001 and 1003 are set as a sub frame and a main frame, respectively, through a user operation, the display control unit 70 performs a control operation to display the setting information 1006 in front of the face detection frame 1001 and to display the face detection frame 1003 in front of the histogram 1005.

Processing for determining an object to be displayed in front, i.e., a face detection frame or various kinds of information, will now be described using a flowchart shown in FIG. 10. Steps similar to those included in the flowchart shown in FIG. 8 are designated by similar or like references and a description thereof is omitted. The display control unit 70 performs processing at steps S203 to S209.

If a setting for displaying various kinds of information on the image display unit 28 during live view shooting is selected (YES at S102), the display control unit 70 determines whether to display a face detection frame on the image display unit 28 (S203). When a face detection mode is selected by a user, the face detection frame is displayed to enclose a face of a subject automatically detected in a captured live view image. When a plurality of faces of subjects are detected, a plurality of face detection frames are displayed. The face detection frames are categorized into a main frame and a sub frame based on the size of an area determined to include a face and the position of the area.

If a setting for displaying the face detection frame on the image display unit 28 is selected (YES at S203), the display control unit 70 determines whether the face detection frame is a main frame (S204). If the face detection frame is determined to be a main frame (YES at S204), the process proceeds to STEP S205. If the face detection frame is determined to be a sub frame (NO at S204), the display control unit 70 displays the various kinds of information in front of the face detection frame regardless of the overlapping state of the face detection frame and various kinds of information (S207).

If the face detection frame is a main frame (YES at S204), the display control unit 70 determines whether the size of the face detection frame can be estimated on the basis of the position and size of the face detection frame and the position of the various kinds of information even if the various kinds of information are displayed in front of the face detection frame (S205). Whether the size of the face detection frame can be estimated even if the various kinds of information are displayed in front of the face detection frame is determined based on the criteria shown in FIGS. 7A-7H.

If it is determined that estimation of the size of the face detection frame is difficult when the various kinds of information are displayed in front of the face detection frame (NO at S205), the display control unit 70 displays the face detection frame in front of the various kinds of information (S206).

If the size of the face detection frame can be estimated when the various kinds of information are displayed in front of the face detection frame (YES at S205), the display control unit 70 displays the various kinds of information in front of the face detection frame (S207).

The display control unit 70 then determines whether there is a face detection frame that has not been displayed yet after displaying the face detection frame at STEP S206 or S207 (S208). If there is a face detection frame that has not been displayed yet (YES at S208), the process returns to STEP S204. Otherwise, the process proceeds to STEP S209.

The display control unit 70 then determines whether the position or the size of the face detection frame has been changed (S209). If the position or the size of the face detection frame has been changed (YES at S209), the process returns to STEP S204. Otherwise, the process proceeds to STEP S108. If the displayed face detection frame is hidden, the process also proceeds to STEP S108. If a face detection frame is newly displayed, the process returns to STEP S204. Additionally, if the position or the size of the face detection frame has not been changed but the face detection frame is switched from the main frame to the sub frame or from the sub frame to the main frame, the process also returns to STEP S204.

As described above, different control operations are performed in accordance with whether a face detection frame is a main frame or a sub frame, thereby allowing a user to optimally recognize both of the face detection frame and various kinds of information, which thus results in an improvement of a user interface.

Although determination of whether the face detection frame is a main frame is performed one by one when a plurality of face detection frame are displayed in the flowchart shown in FIG. 10, the determination may be performed regarding the plurality of face detection frames at the same time.

Additionally, when the determination of whether the face detection frame is a main frame is performed one by one and only one main frame is displayed in a single image, this determination may be omitted after one face detection frame is determined as the main frame and the process may then proceed to STEP S207.

In addition, although FIG. 10 shows the flowchart of processing performed during live view shooting, the above-described display control operation regarding the face detection frame and the various kinds of information is not limited to the live view shooting operation. For example, this display control operation can be applied to a playback mode, which is started in response to an operation of the play button 212, shown in FIG. 2, for starting playback of images that have been captured and recorded. During playback of the images that have been captured and recorded, the display control operation can be applied to a case where various kinds of information and face detection frames are displayed at the same time in order to confirm the various kinds of information employed when the images are captured or a face of a main subject.

A third exemplary embodiment of the present invention will now be described. A digital camera according to the third exemplary embodiment of the present invention has a configuration shown in the block diagram of FIG. 1. Since the configuration is similar to that employed in the first exemplary embodiment, a description thereof is omitted.

Although a rectangular face detection frame is used in the second exemplary embodiment, a circular face detection frame is used in the third exemplary embodiment. When the circular face detection frame is used, criteria used in determination of an object to be displayed in front, i.e., the face detection frame or the various kinds of information, differ from the criteria employed when a rectangular face detection frame is used.

FIGS. 11A-11D are diagrams showing criteria employed when the display control unit 70 determines which to display in front, a face detection frame or various kinds of information, in accordance with an overlapping state of the face detection frame and the various kinds of information.

Figure 11A:
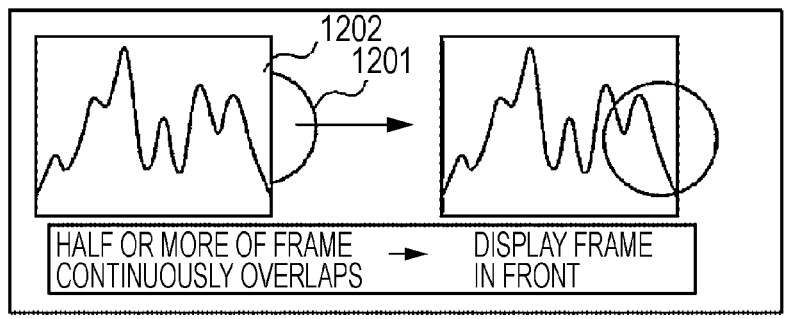
FIGS. 11A-11D are diagrams showing criteria employed when whether a circular face detection frame or various kinds of information is displayed in front is determined.

FIG. 11A shows a case where it is determined that the face detection frame is displayed in front of the various kinds of information.

Figure 11B:
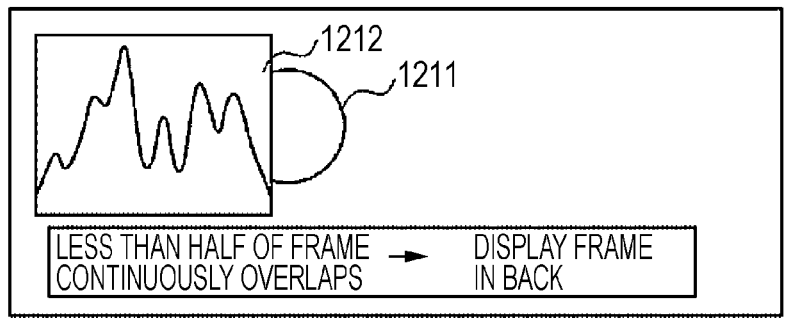
Figure 11C:
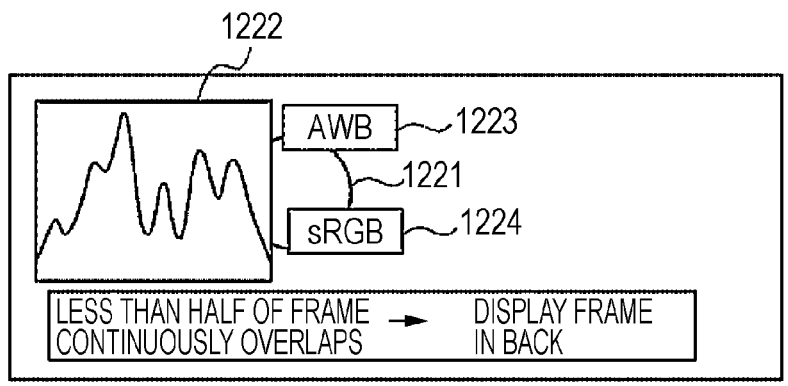

FIGS. 11B and 11C show cases where it is determined that the various kinds of information are displayed in front of the face detection frame.

Referring to FIG. 11A, a half or more part of the circumference of a face detection frame 1201 continuously overlaps a histogram 1202. In this case, estimation of the size of the face detection frame 1201 is difficult if the histogram 1202 is displayed in front of the face detection frame 1201. Accordingly, the display control unit 70 performs a control operation to display the face detection frame 1201 in front of the histogram 1202.

Referring to FIG. 11B, less than a half part of the circumference of a face detection frame 1211 continuously overlaps a histogram 1212. In this case, the size of the face detection frame 1211 can be estimated even if the histogram 1212 is displayed in front of the face detection frame 1211. Accordingly, the display control unit 70 performs a control operation to display the histogram 1212 in front of the face detection frame 1211.

Referring to FIG. 11C, a half or more of the total circumference of the face detection frame 1221 overlaps white balance setting information 1223 and color space setting information 1224. However, since the continuously overlapping part is less than a half, the size of the face detection frame 1221 can be estimated even if the white balance setting information 1223 and the color space setting information 1224 are displayed in front of the face detection frame 1221. Accordingly, the display control unit 70 performs a control operation to display the various kinds of information in front of the face detection frame 1221.

Figure 11D:
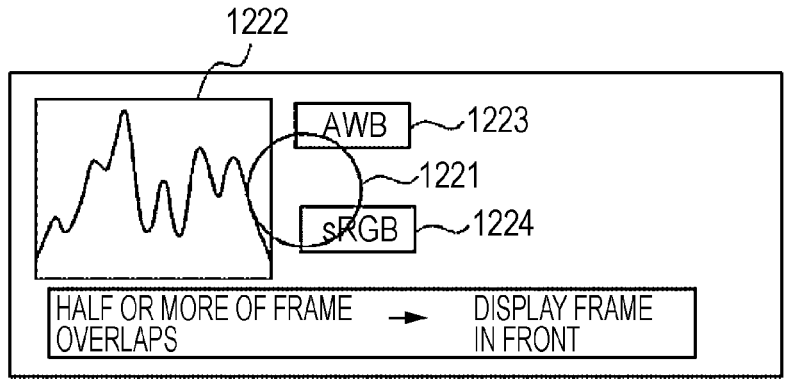

When a gap between the various kinds of information is smaller in FIG. 11C, estimation of the size of the face detection frame 1221 may be difficult though a part continuously overlapping the various kinds of information is less than a half. Accordingly, when the total part overlapping the various kinds of information is equal to or more than a half of the circumference, a control operation may be performed so that the face detection frame 1221 is displayed in front of the histogram 1222 as shown in FIG. 11D.

In addition to the circular shape, when a face detection frame is in an oval shape, an object to be displayed in front, i.e., a face detection frame or various kinds of information, may be controlled using similar conditions.

In addition to the face detection frame, the display control operation may be performed using the similar conditions when an AF frame or an enlargement frame specifying an area of a displayed image to be enlarged is in a circular shape.

Processing for determining an object to be displayed in front, i.e., the face detection frame or the various kinds of information, according to this exemplary embodiment is similar to that shown in the flowchart of FIG. 10. Since only the criteria used at STEP S205 differ, a description thereof is omitted.

As described above, an overlapping state of a face detection frame and various kinds of information is determined even if the face detection frame is circular and an object to be displayed in front is controlled based on the determination, thereby allowing a user to optimally recognize both of the face detection frame and the various kinds of information, which thus results in an improvement of a user interface.

Although the above-described three exemplary embodiments are described regarding a digital camera having an exchangeable lens unit, a lens-integrated digital camera having a live-view shooting function may be employed.

In addition, for example, different kinds of frames, such as an AF frame and a face detection frame, may be displayed on the image display unit 28 at the same time.

Additionally, when one frame overlaps another frame in the case where a plurality of frames are displayed on the image display unit 28, a smaller frame may be displayed in front. Alternatively, a frame to be displayed in front may be determined in accordance with the kinds of frames. For example, when the AF frame overlaps the face detection frame, the AF frame, which is displayed at a position reflecting a user operation, may be displayed in front of the face detection frame since the face detection frame is displayed at a position of a face of a subject.

Furthermore, the shape of frames is not limited to a rectangle or a circle. Various shapes, such as a star shape and a heart shape, may be used. Criteria for determining the object to be displayed in front, i.e., various frames or various kinds of information, may be set in accordance with whether the size of the frames can be estimated even if the various kinds of information are displayed in front of the frames. For example, when a ratio of a part overlapping the various kinds of information to the entire frame is equal to or higher than a predetermined value, the frame may be displayed in front. If the ratio is lower than the predetermined value, the various kinds of information may be displayed in front. Alternatively, when a predetermined part of the frame overlaps the various kinds of information, the frame may be displayed in front. Otherwise, the various kinds of information may be displayed in front. The predetermined value and the predetermined part may be set in accordance with the shape of the frame.

Moreover, when the frame overlaps the various kinds of information in a configuration where semitransparent processing is performed on the displayed various kinds of information so that an image displayed under the various kinds of information can be seen, the various kinds of information may be displayed in front of the frame. Whether to perform semitransparent processing may be determined on the basis of the overlapping state.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Patent Application No. 2008-061289 filed on Mar. 11, 2008, which is hereby incorporated by reference herein in its entirety.

What is claimed is:

1. An image capturing apparatus comprising:
an image capturing unit configured to capture an image of a subject to acquire image data;
a display unit configured to display the image of the subject based on the image data acquired by the image capturing unit;
a display control unit configured to perform a control operation so that information displayed at a predetermined position and a movably displayed frame are superimposed on the image of the subject displayed by the display unit;
a face detecting unit configured to detect faces of the subjects based on the image data acquired by the image capturing unit; and
a selecting unit configured to select a face of a main subject from the faces of the subjects detected by the face detecting unit,
wherein, when a plurality of the frames that enclose the faces of the subjects detected by the face detecting unit are displayed, the display control unit switches, in accordance with an overlapping state of the frame and the information, an object to be preferentially displayed between the information and the frame regarding the frame that encloses the face of the main subject selected by the selecting unit, the information is displayed preferentially when the information overlaps the frame that encloses a face of a subject other than the main subject.

2. A display control method comprising:
displaying an image of a subject on a display unit based on image data acquired by an image capturing unit; and
controlling information displayed at a predetermined position and a movably displayed frame to be superimposed on the image of the subject displayed by the display unit,
detecting faces of the subjects based on the image data acquired by the image capturing unit; and
selecting a face of a main subject from the faces of the subjects detected by the face detecting unit,
wherein, when a plurality of the frames that enclose the faces of the subjects detected in the detecting step are displayed, switching, in accordance with an overlapping state of the frame and the information, an object to be preferentially displayed between the information and the frame regarding the frame that encloses the face of the main subject selected in the selecting step, the information is displayed preferentially when the information overlaps the frame that encloses a face of a subject other than the main subject.

3. An apparatus comprising:
an image capturing unit configured to capture an image to acquire image data;
a display unit configured to display the image and a plurality of frames;
a selecting unit configured to select a main frame from among the plurality of frames; and
a display control unit configured to:
superimpose information at a predetermined position on the image, the information is superimposed on the plurality of frames not including the main frame;
determine an overlapping state of the main frame and the information;
in a first case, the frame is superimposed over the information, when the overlapping state meets or exceeds a first criteria; and
in a second case, the information is superimposed over the frame, when the overlapping state does not meet or exceed the first criteria.

4. A method comprising:
displaying the image and a plurality of frames; and
selecting a main frame from among the plurality of frames; and
displaying information at a predetermined position on the image, wherein the information is superimposed on the plurality of frames not including the main frame;
determining an overlapping state of the main frame and the information;
in a first case, the main frame is superimposed over the information, when the overlapping state meets or exceeds a first criteria; and
in a second case, the information is superimposed over the main frame, when the overlapping state does not meet or exceed the first criteria.

* * * * *